United States Patent
Gey et al.

(10) Patent No.: US 12,479,511 B2
(45) Date of Patent: Nov. 25, 2025

(54) ROOF FOR A MOTOR VEHICLE HAVING A SENSOR SYSTEM FOR DETECTING A VEHICLE ENVIRONMENT

(71) Applicant: Webasto SE, Stockdorf (DE)

(72) Inventors: Markus Gey, Stockdorf (DE); Stephan Buckl, Stockdorf (DE); Fabian Will, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 382 days.

(21) Appl. No.: 18/036,571

(22) PCT Filed: Aug. 4, 2021

(86) PCT No.: PCT/EP2021/071810
§ 371 (c)(1),
(2) Date: May 11, 2023

(87) PCT Pub. No.: WO2022/106078
PCT Pub. Date: May 27, 2022

(65) Prior Publication Data
US 2023/0415819 A1  Dec. 28, 2023

(30) Foreign Application Priority Data
Nov. 19, 2020  (DE) .................... 10 2020 130 592.3

(51) Int. Cl.
*B62D 25/06*  (2006.01)
*B60H 1/00*  (2006.01)
(Continued)

(52) U.S. Cl.
CPC ......... *B62D 25/06* (2013.01); *B60H 1/00271* (2013.01); *B60K 35/60* (2024.01); *B60R 11/04* (2013.01)

(58) Field of Classification Search
CPC ........................... B62D 25/06; B60H 1/00271
See application file for complete search history.

(56) References Cited

U.S. PATENT DOCUMENTS 11,240,941 B2 * 2/2022 Frederick ............. G05D 1/0088
12,172,604 B2 * 12/2024 Huelsen ................. B62D 25/06
(Continued)

FOREIGN PATENT DOCUMENTS

| DE | 102012110584 A1 | 6/2014 |
|---|---|---|
| DE | 102019124362 A1 | 3/2020 |
| DE | 102019105339 A1 | 9/2020 |

OTHER PUBLICATIONS

International Search Report for PCT/EP2021/071810; mailed Nov. 22, 2021; in German and English (5 Pages).
(Continued)

*Primary Examiner* — Aaron L Lembo
(74) *Attorney, Agent, or Firm* — Fitch, Even, Tabin & Flannery, LLP

(57) ABSTRACT

A roof for a motor vehicle, in particular for a passenger car, having a roof skin which is disposed above a roof substructure and having a sensor system which has at least one sensor module having at least one environment sensor for detecting a vehicle environment. The roof has a cooling device for the sensor module, said cooling device having a compressed-air device by which compressed air is applied to the sensor module.

12 Claims, 3 Drawing Sheets

(51) Int. Cl.
*B60K 35/60*     (2024.01)
*B60R 11/04*     (2006.01)

(56)        References Cited

U.S. PATENT DOCUMENTS

| | | |
|---|---|---|
| 12,194,928 B2 * | 1/2025 | Langlais ................. B60R 11/04 |
| 12,233,944 B2 * | 2/2025 | Lehotsky ................. B60R 11/04 |
| 2017/0261273 A1 * | 9/2017 | Maranville ............ G01S 17/931 |
| 2020/0084920 A1 | 3/2020 | Frederick |
| 2020/0100397 A1 * | 3/2020 | Kamil ................... G01S 7/4813 |
| 2022/0161860 A1 | 5/2022 | Friedrich |
| 2023/0254556 A1 * | 8/2023 | Omohundro ........... G03B 17/55 |
| | | 348/148 |
| 2024/0367619 A1 * | 11/2024 | Ehrmann .................. B60S 1/54 |
| 2025/0196565 A1 * | 6/2025 | Sviberg .................... H05K 7/20 |

OTHER PUBLICATIONS

IPRP for PCT/EP2021/071810; mailed May 16, 2023; in English (6 Pages).

\* cited by examiner

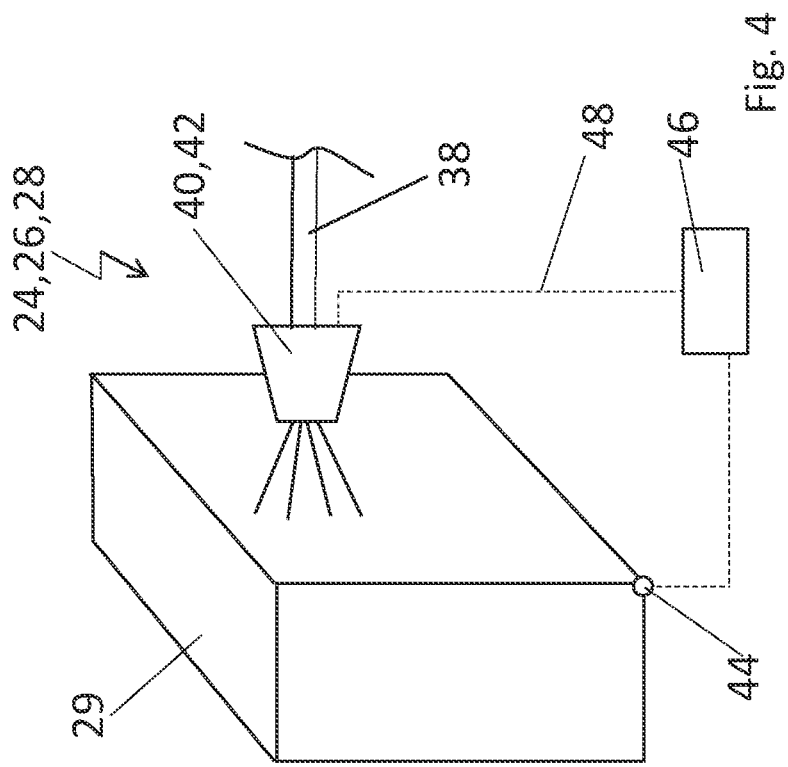

ROOF FOR A MOTOR VEHICLE HAVING A SENSOR SYSTEM FOR DETECTING A VEHICLE ENVIRONMENT

CROSS-REFERENCE TO RELATED APPLICATIONS

This application is a U.S. national phase application filed under 35 U.S.C. § 371 of International Application No. PCT/EP2021/071810, filed on Aug. 4, 2021, published under WO 2022/106078A1 on May 27, 2022, designating the United States, which claims priority from German Patent Application Number 10 2020 130 592.3, filed on Nov. 19, 2020, which are hereby incorporated herein by reference in their entirety for all purposes.

FIELD

The invention relates to a roof for a motor vehicle, in particular for a passenger car, comprising the features of the preamble of patent claim 1.

BACKGROUND

A roof of this kind is known from practice and can be formed as a roof module which can be fitted as a separate component part on a vehicle carcass of a passenger car, said vehicle body forming a vehicle carcass. For connecting the roof module, the vehicle body comprises roof rails which represent a carrying element of the carcass for the roof module. As an outer viewing area, the vehicle roof comprises a roof skin which is disposed above a roof substructure, which forms the intersection with the roof rails. For forming a panoramic roof, the roof skin arrangement can be at least partially transparent. In addition, the vehicle roof can have a roof opening system which comprises a displaceable lid element by means of which a roof opening can either be opened or closed. Furthermore, to allow the respective motor vehicle to drive autonomously or semi-autonomously, the known roof has a sensor system which comprises several sensor modules, each having at least one environment sensor for detecting a vehicle environment. The environment sensors are connected to a control device, which, in turn, is connected to a control of the respective vehicle such that the driving behavior of the vehicle can be influenced in accordance with the signals of the environment sensors. During operation, the environment sensors can become heated. To ensure a flawless performance, however, the environment sensors must be kept within a certain temperature range.

SUMMARY

The object of the invention is to provide a roof of the kind described above whose sensor system can be kept within a specified temperature range during operation.

According to the invention, this object is attained by the roof having the features of patent claim 1.

According to the invention, a roof of a motor vehicle is proposed which comprises a roof skin, a roof substructure, which is disposed below the roof skin, and a sensor system, which has at least one sensor module having at least one environment sensor for detecting a vehicle environment. To prevent the environment sensors from becoming heated unintendedly, the roof according to the invention comprises a cooling device for the sensor module which has a compressed-air device by means of which compressed air can be applied to the sensor module. The compressed air, which expands upon application and thus cools down, effectively cools the sensor module, whereby the environment sensor is cooled. The expanded compressed air has a high cooling capacity. In addition, targeted cooling can be achieved since the component to be cooled can be directly exposed to the expanding compressed air. A compressed-air device can be integrated into the roof requiring only very little installation space because the required lines can be very thin. It can also be ensured that the cooling medium, which is formed by air or, if applicable, another suitable gas, has a high purity. It is conceivable to use the cooling device according to the invention in combination with other cooling systems for the sensor module.

In a specific embodiment of the roof according to the invention, the compressed-air device, by means of which compressed air can be applied to the sensor module, comprises a compressed-air line and preferably a compressed-air nozzle, into which the compressed-air line advantageously opens. It is also conceivable that there is no specific nozzle disposed at the end of the compressed-air line but that the compressed air is applied directly to the sensor module from the line without interposing a nozzle. The compressed-air line can be integrated into the roof in a highly flexible manner without causing installation space problems for other roof components.

In a specific embodiment, in which the component to be cooled is directly exposed, the compressed-air nozzle and/or the compressed-air line is directed at the environment sensor. The environment sensor is thus cooled with a high cooling capacity.

In order to retain the expanded and cooled air around the component to be cooled, the sensor module comprises an expansion chamber into which the compressed-air nozzle or the compressed-air line opens and which is adjacent to the environment sensor in a specific embodiment of the roof according to the invention. When the cooling device is activated, the compressed air is directed into the expansion chamber in which it expands and thus cools down. Advantageously, the expansion chamber has an outlet.

To also be able to cool in particular less critical components of the roof, it is conceivable that the air expanding in the expansion chamber is used for cooling at least one more component that is not directly exposed to the compressed air. In a specific embodiment of the roof according to the invention, the expansion chamber is thus not only adjacent to one environment sensor but to two environment sensors which can both be cooled by the expanding gas.

To provide the environment sensor to be cooled with a particularly large area for the cooling medium, i.e., the expanding air, to act on, the environment sensor is connected to or provided with cooling ribs in a specific embodiment of the roof according to the invention.

Advantageously, a compressed-air source is provided which provides the compressed air that can be applied to the sensor module. In particular compressed air systems of the roof structure of the vehicle structure which have already been provided can be used as compressed-air sources. For example, cleaning systems are integrated in the roof according to the invention which use the compressed air of a compressed-air source to clean a sensor see-through portion which is formed in particular by the roof skin and via which an environment sensor communicates with the surroundings.

The compressed-air source can comprise in particular a compressor for compressing air. Furthermore, the compressed-air source can comprise a compressed-air storage in which compressed air is available.

In a specific embodiment of the roof according to the invention, several sensor modules which each comprise at least one environment sensor for detecting a vehicle environment are provided. In this case, the compressed-air source can be connected to several compressed-air lines which are each assigned to one sensor module.

To be able to apply the compressed air to the component to be cooled in a targeted manner and only as needed, the compressed-air device can comprise a compressed-air valve. Actuating the compressed-air valve causes compressed air to be applied to the sensor module. The compressed-air valve can be disposed on the end of a compressed-air line and also comprise the compressed-air nozzle.

A preferred embodiment of the roof according to the invention is designed as a roof module. In an integrated manner, a roof module is a component part which comprises components that are required for the respective vehicle to drive autonomously or semi-autonomously and which can be connected to a vehicle body or a vehicle carcass, which can comprise roof rails, such as roof side rails and transverse roof rails, as an intersection with the roof module, as a compact modular unit by a vehicle manufacturer. By integrating the sensor system and the cooling device, the roof formed as a roof module is a roof sensor module (RSM) which allows the respective vehicle to drive autonomously or semi-autonomously.

The vehicle, which is provided with the roof according to the invention and which is an autonomously driving vehicle, drives independently in an autonomous driving mode, at least without significant interference from the driver. In a semi-autonomous driving mode, the roof according to the invention is part of a driver assistance system, for example.

Furthermore, the roof according to the invention can also be provided with a transparent fixed roof portion, which is part of the roof skin arrangement, and/or with a roof opening system for a roof opening, which is limited by the roof skin.

In particular, the roof according to the invention is a roof of a passenger car. However, it can also be a roof of a commercial vehicle, which is for example a delivery vehicle, a bus, an autonomously driving mini bus, such as a people mover, or a tractor unit.

The environment sensor of the sensor module can be designed in various ways, use electromagnetic radiation and/or acoustic waves and comprise, for example, a lidar sensor, a radar sensor, an optical sensor, such as a camera, which can also be a stereo camera, and/or the like.

If the environment sensor is a lidar sensor, it preferably operates in a wavelength range of approximately 905 nm or approximately 1550 nm. A camera used as an environment sensor can operate in the wavelength range of visible light and/or in the infrared range.

The subject manner of the invention is also a motor vehicle which comprises a roof of the kind described above and on which a roof module can be placed in particular on a vehicle carcass, the roof module being formed as a roof sensor module.

Further advantages and advantageous embodiments of the object of the invention can be derived from the description, the drawing and the patent claims.

BRIEF DESCRIPTIONS OF THE DRAWINGS

An embodiment of a motor vehicle having a roof according to the invention is illustrated schematically simplified in the drawing and is described in more detail hereinafter.

FIG. 4 shows a schematic view of a sensor module having a compressed-air cooling.

DETAILED DESCRIPTION

Figure 1:
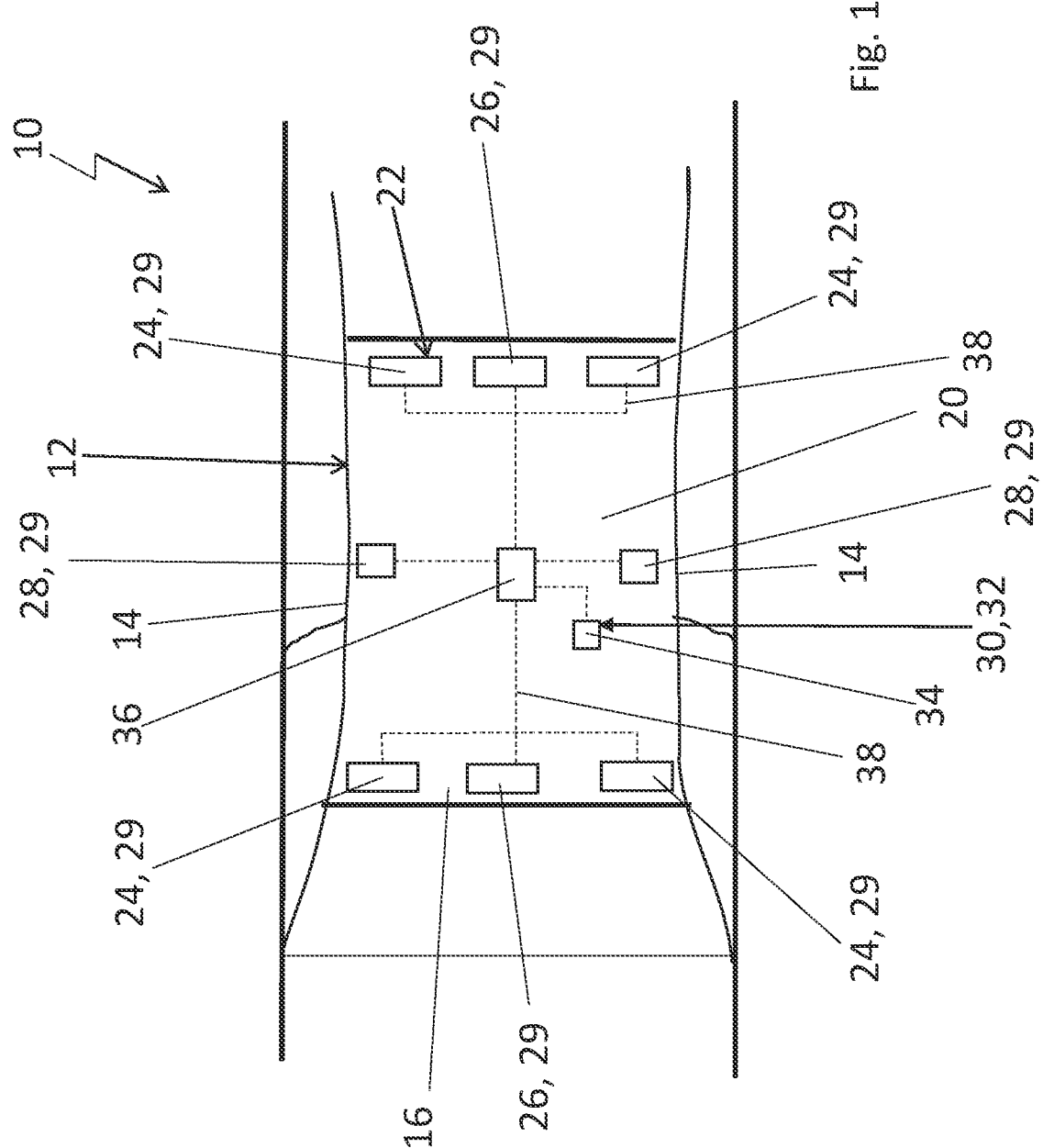
FIG. 1 shows a schematic top view of a motor vehicle having a roof according to the invention.

The drawing shows a motor vehicle 10 which is formed as a passenger car and which has a vehicle roof 12, which comprises a roof side rail 14 on either side of a vertical longitudinal center roof plane, roof side rail 14 being part of a vehicle body representing a carcass. Between roof side rails 14, vehicle roof 12 comprises a roof module 16 which is rigidly connected to roof side rails 14 forming a vehicle carcass support structure.

Roof module 16 comprises a roof skin 18 and a roof substructure 20 which is formed as a roof frame, for example, and which forms an intersection of roof module 16 with the vehicle body.

Roof module 16 is a roof sensor module (RSM) which has devices that allow motor vehicle 10 to drive autonomously. To this end, roof module 16 has a sensor system 22 which comprises a sensor module 24, 26 or 28 in each of the four corner areas of roof module 16, centrally in the front and rear and also centrally on the longitudinal sides.

Sensor modules 24, 26 and 28 are mounted on roof substructure 20. Sensor modules 24, 26 and 28 each comprise at least one environment sensor 29 by means of which the vehicle environment can be detected so motor vehicle 10 can drive autonomously. By evaluating the measuring signals of environment sensors 29 by means of a control device of motor vehicle 10, a respective traffic situation can be determined such that motor vehicle 10 can autonomously or independently adapt to the respective traffic situation and act accordingly.

Environment sensors 29, which are disposed below roof skin 18, can have various designs and comprise, for example, a lidar sensor, a radar sensor, a camera, an antenna device and/or another suitable sensor. In order that the environment sensors can communicate with or detect the environment, roof skin 18 is provided with a see-through portion in the area of each environment sensor, said see-through portion being transparent for the wavelengths used by the respective environment sensor. In particular, the sensor see-through portions are transparent for wavelengths in the range between 300 nm and 2000 nm. Transparency for radar beams at close range, mid-range and/or far range can also be advantageous.

Figure 3:
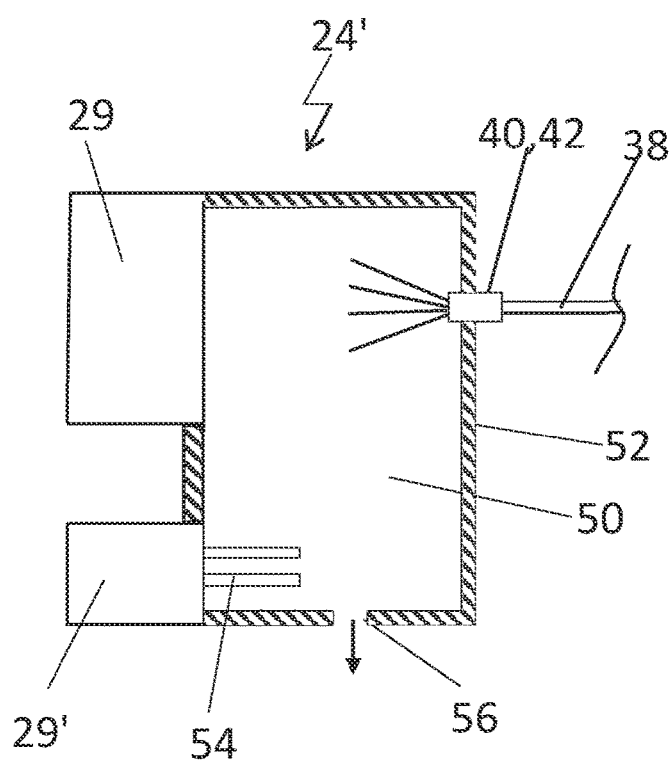
FIG. 3 shows a perspective view of an environment sensor having a compressed-air cooling.

To prevent the environment sensors of sensor modules 24, 26 and 28 from becoming too heated and thus from losing their functionality, roof module 16 is provided with a cooling device 30 which comprises a compressed-air device 32. Compressed-air device 32 comprises a compressed-air source which is provided with a compressor 34 which supplies compressed air to a compressed-air storage 36, in which compressed air is available at a constant pressure. Compressed-air storage 36 is connected to a grid of compressed-air lines 38 which each lead to one of sensor modules 24, 26 and 28 where they are connected to a compressed-air valve 40 which serves as an outlet valve. Compressed-air valves 40 each comprise a compressed-air nozzle 42, which is directed at the environment sensor of respective sensor module 24, 26 or 28. As FIG. 3 shows, sensor modules 24, 26 and 28 are each provided with a temperature sensor 44 which measures the current sensor temperature and transmits it to control device 46, which is connected to respective compressed-air valve 40 via a control line 48.

Environment sensors 29 of sensor modules 24, 26 and 28 each operate optimally within a certain temperature range. If a temperature outside of the temperature range is measured via respective temperature sensor 44, respective compressed-air valve 40 is opened by means of control device 46 such that compressed air is dispensed from compressed-air storage 36 via respective compressed-air line 38 and respective compressed-air nozzle 42 towards the respective environment sensor. After the compressed air has been discharged via compressed-air nozzle 42, the compressed air expands, whereby it cools down while also cooling the respective environment sensor and keeping it within the specific temperature range.

Figure 2:
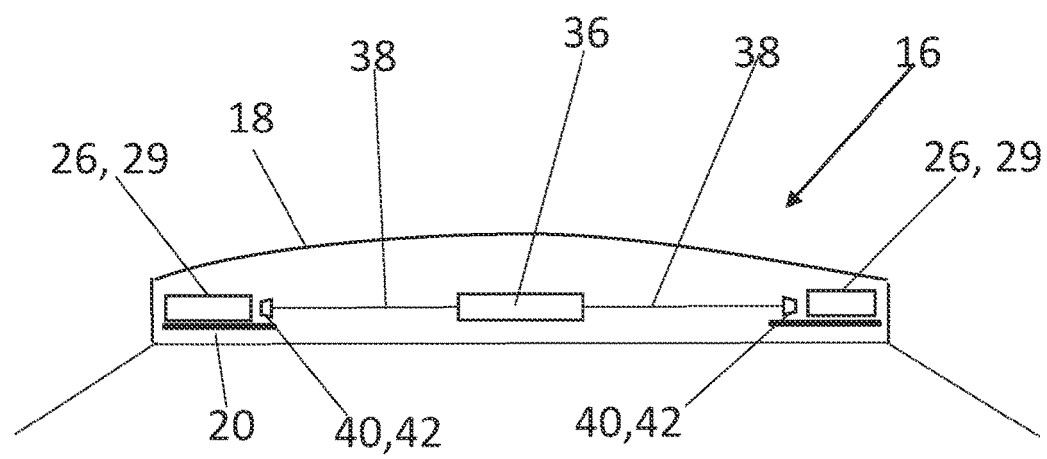
FIG. 2 shows a schematic longitudinal cut through the roof according to FIG. 1.

FIG. 4 shows a sensor module 24' which can be integrated in the vehicle roof shown in FIG. 1 and which comprises a first environment sensor 29 and a second environment sensor 29'. For example, environment sensor 29 is a lidar sensor, whereas environment sensor 29' can be a camera, in particular a stereo camera. Environment sensors 29 and 29' are adjacent to an expansion chamber 50, which is formed by a housing wall 52 of sensor module 24'. Housing wall 52 is penetrated by a compressed-air valve 40 having a compressed-air nozzle 42, which is disposed at the end of a compressed-air line 38, which is connected to a compressed-air storage (not shown) of the type shown in FIGS. 1 and 2.

On the side wall of environment sensor 29' which is adjacent to expansion chamber 50, environment sensor 29' has cooling ribs 54 which extend into expansion chamber 50.

If a temperature sensor determines that the operating temperature of environment sensors 29 and 29' is not within a target temperature range, compressed air can be conducted into expansion chamber 50 via compressed-air line 38 and compressed-air nozzle 42, where it expands and cools down and can thus be used to cool environment sensors 29 and 29'. The compressed air is applied directly to environment sensor 29. By contrast, environment sensor 29' is cooled indirectly via the expanded air in expansion chamber 50 which acts on cooling ribs 54. The air supplied to expansion chamber 50 can exit via an outlet 56, which is formed in housing wall 52.

The invention claimed is:

1. A roof for a motor vehicle, comprising:
   a roof skin which is disposed above a roof substructure and comprising a sensor system which comprises at least one sensor module having at least one environment sensor for detecting a vehicle environment,
   the roof skin having a cooling device for the at least one sensor module, said cooling device comprising a compressed-air device from which compressed air is applied to the at least one sensor module.

2. The roof according to claim 1, wherein the compressed-air device comprises a compressed-air line and a compressed-air nozzle.

3. The roof according to claim 2, wherein the compressed-air nozzle or the compressed-air line is directed at the environment sensor.

4. The roof according to claim 2, wherein the at least one sensor module comprises an expansion chamber into which the compressed-air nozzle opens and which is adjacent to the environment sensor.

5. The roof according to claim 4, wherein the expansion chamber is adjacent to at least two environment sensors.

6. The roof according to claim 1, wherein the environment sensor is connected to cooling ribs.

7. The roof according to claim 1, further comprising a compressed-air source.

8. The roof according to claim 7, wherein the compressed-air source comprises compressed-air storage.

9. The roof according to claim 7, wherein the compressed-air source is connected to at least one compressed-air line which are assigned one each to each of the least one sensor module.

10. The roof according to claim 1, wherein the compressed-air device comprises a compressed-air valve.

11. The roof according to claim 1, wherein the roof is a roof module.

12. A motor vehicle comprising a roof according to claim 1.

* * * * *